United States Patent Office 3,313,582
Patented Apr. 11, 1967

3,313,582
METHOD OF WELDING RETAINER RINGS
Henry Hubbell, Southington, Conn., assignor to The Fafnir Bearing Company, New Britain, Conn., a corporation of Connecticut
Filed Apr. 15, 1965, Ser. No. 448,511
8 Claims. (Cl. 308—201)

This invention relates to the assembling of anti-friction bearing retainer rings and more particularly to ball bearing assemblies having retainer rings characterized by improved strength properties.

Heretofore ball bearing retainer rings were fastened together mechanically either by riveting two halves of mild steel together or by using crimping fingers which extended radially from the periphery of a first ring and which were bent over and crimped against a second ring abutting the first. The rings were assembled with a complement of bearing balls therebetween with the object of supporting them freely within the bearing races. However, the foregoing types of retainer fastenings were not inherently strong and tended to deform or fail.

In overcoming the foregoing disadvantages, spot welding was developed as a means of uniting the retainer halves into a one-piece configuration. This method of assembly was found to be inherently more strong in straight tension or shear than either the riveted or finger type fastening. For example, it was found, in comparing a spot welded steel fastening with a riveted fastening, that the welded fastening has approximately 1.4 times the pull-apart strength of a comparable riveted fastening. Among the other advantages were increased rigidity, better alignment of retainer halves, and more freedom in retainer design.

Development work has continued on the welded type retainer rings for anti-friction bearings with the object of further improving their strength characteristics. For example, it was observed that with mild steel rings containing 0.08% or 0.1% by weight or more of carbon, the desired pull-apart strength at the spot weld was not always obtained. It was found that the pull-apart strength at the weld would be of the order of 200 to 250 lbs.

I have now found that I can vastly improve the strength of the welded steel fastener provided particular care is taken in controlling the carbon content of the steel at the weld.

It is thus the object of my invention to provide a welded steel ball bearing retainer ring characterized by improved strength properties.

Another object is to provide a method for assembling an anti-friction bearing retainer ring.

A still further object is to provide an anti-friction bearing, e.g., a ball bearing, having a welded steel retainer ring characterized by improved resistance to deformation and breaking.

These and other objects will more clearly appear from the following description and the accompanying drawing, wherein:

FIG. 5 illustrates an embodiment for spot welding the whole retainer in a one-step operation; while

In carrying out my invention of assembling bearing retainer halves into a unitary construction, I find I get improved pull-apart strength at the weld provided the carbon content at the surface of the weld areas does not exceed and preferably is below 0.06% by weight. I find that this can be done by decarburizing the surface of the steel during annealing or by selecting steel made by the rimming process which by the very nature of the process has a lower carbon content at the surface. In any event, I find that so long as the area being spot welded is low in carbon, pull apart strengths are obtained of almost double that of welds containing carbon in excess of 0.06% C, such as 0.12% carbon.

Figure 1:
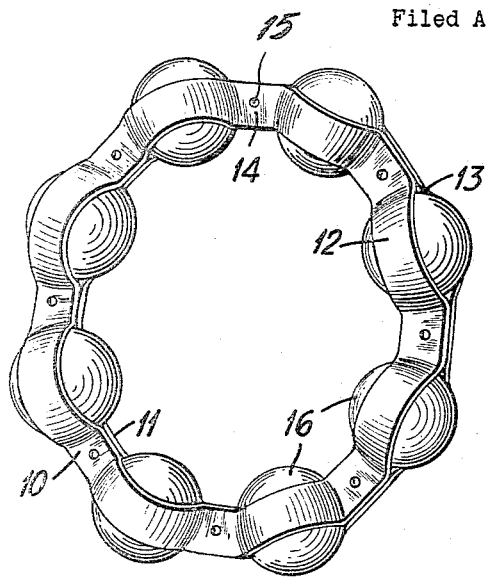
FIG. 1 illustrates a welded steel ball bearing retainer ring containing a complement of bearing balls.

As illustrative of the retaining rings with which this invention is concerned, reference is made to FIG. 1 which shows a pair of rings 10, 11 having spaced along the annulus formed ball-receiving pockets 12, 13, the rings being in abutting relationship at their flat portions 14 and spot-welded therealong as shown at welding spots 15. The welded rings have retained in the pocket sections between them a complement of bearing balls 16.

Figure 2:
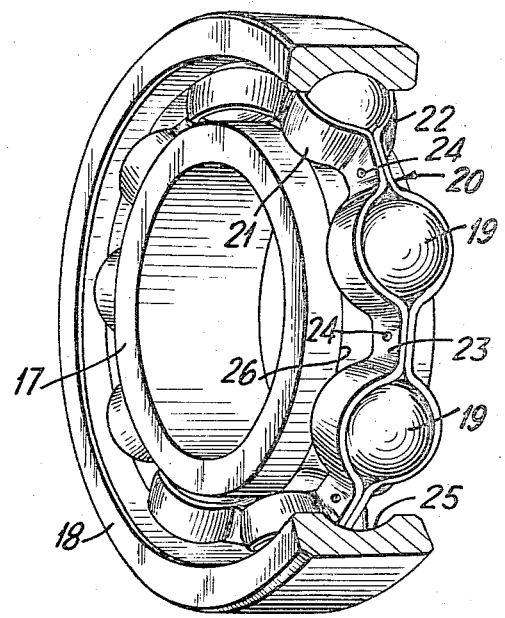
FIG. 2 is a fragment of a completed anti-friction bearing showing the positioning of the welded retainer ring between the inner and outer annular race members.

In FIG. 2 a break-away view is shown of a completed anti-friction bearing comprising an inner annular raceway member 17, an outer annular raceway member 18 and a complement of balls 19 held within retainer ring 20 comprising two retainer halves 21, 22 spot welded together at their abutting flat portions 23 at weld areas 24. The bearing balls ride within ball grooves 25 of the outer bearing ring and 26 of the inner bearing ring. I find that in using my invention, bearings of this type will have stronger retainer rings or cages and will exhibit greater resistance to deformation and to breaking, for example, as might arise under heavy bearing loads and bearing misalignment.

Figure 3:
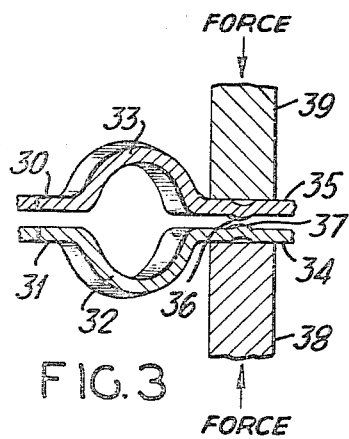
FIGS. 3 and 4 depict diagrammatically one embodiment of a spot welding technique which may be employed in carrying out the invention.
Figure 4:
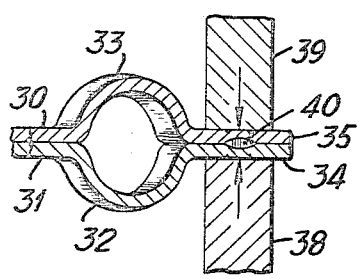

In preparing and assembling the retainer ring, I prefer to use the projection method of spot welding. This method comprises placing spaced projections, e.g., embossments or small dimples on each of the retainer halves at the flat areas to be spot welded. The two halves are then aligned together with their respective projections touching each other at their convex portions and the whole retainer spot welded by applying pressure and welding current simultaneously at each of the projections which flatten out substantially and diffuse into each other. The welding may be carried out with the parts submerged in oil in order to minimize heat marks. As illustrative of this method, reference is made to FIGS. 3 and 4 which depict diagrammatically the preferred welding method. In FIG. 3, a fragment of two retainer halves 30, 31 is shown comprising ball-receiving pockets 32, 33 oppositely disposed to each other, and flat portions 34, 35 aligned with projections 36, 37 facing each other. Electrodes 38, 39 are shown positioned normal to the flat portions of the retainer halves with the force applied against the projections from the top and bottom as shown in FIG. 4, the projections being fused together to form a nugget 40 at the center of the weld (see also FIG. 6).

Figure 5:
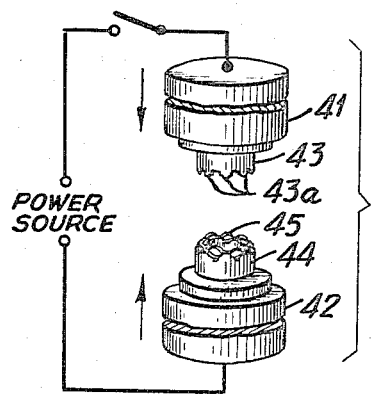

In actual practice, the two retainer halves are welded together at all of the projections simultaneously utilizing a welding electrode assembly of the type shown diagrammatically in FIG. 5 comprising hydraulic rams or pistons 41, 42. Ram 41 has extending downwardly from it a cylindrical electrode assembly 43 having a plurality of projecting electrode contacting points 43a, while ram 42 has extending upwardly from it an electrode assembly 44 also having projecting electrode contacting points between which the assembled retainer ring is supported. A source of low voltage and high current is connected to the opposed electrodes. As shown on lower electrode 44, a retainer assembly 45 with balls located in the pockets is supported ready for the welding step. As the rams are brought together, the retainer halves are clamped together between the electrodes and a high current passed therethrough, the current being divided equally among the projections so that welds of approximately equal strength are produced. When properly welded, the projections are flattened sufficiently, whereby the end result represents spot welds.

Figure 6:
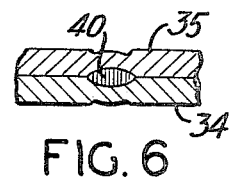
FIG. 6 is a cross section at a weld showing a weld nugget located somewhat centrally of the weld area.

I have found that by keeping the carbon content at the surface of the weld area at below 0.06% by weight of carbon, a weld nugget 40 of the type shown in FIG. 6 is obtained which is generally indicative of good strength properties. For example, when the weld contained about 0.04% carbon, a pull-apart strength of about 400 lbs. was obtained; whereas with a carbon content of 0.12%, the pull-apart strength was 200 lbs., a doubling of strength being obtained at the lower carbon content.

A spot weld produced at a carbon level of about 0.10% exhibited a pull-apart strength of about 250 lbs. while one produced at a carbon level of about 0.06 exhibited a pull-apart strength in the neighborhood of 350 to 400 lbs.

With the poorer welds (that is the higher carbon welds), the weld hardness is rather high and generally ranges from 40 to 44 $R_C$ across the central portion of the weld. With the low carbon welds, on the other hand, the hardness is much lower and may range up to 100 $R_b$. For example, in one weld containing not more than 0.06 carbon, the hardness across the weld from top to bottom in Rockwell B units was as follows: Top–43–89–93.5–89–89–85–89–92–87.5–66–bottom. A good nugget was obtained accompanied by high strength and greater ductility at the center of the weld zone.

Summarizing the foregoing, the invention is directed to the production of a welded anti-friction bearing retainer ring comprising two annular steel retainer rings having receiving pocket sections for confining rolling elements uniformly spaced along the annulus thereof separated by substantially flat spaces, the two halves being welded together at their contacting flat spaces to form a one-piece configuration. The improved method for producing the one-piece configuration resides in providing said rings having a low carbon content not exceeding 0.06% by weight, and preferably below 0.06%, at the weldable flat faces, and spot welding said rings together simultaneously across said flat spaces to produce a ball bearing retainer having improved strength and ductility at the welds.

One of the advantages of the technique illustrated in the drawing is that the whole bearing can be assembled prior to welding the retainer halves with the unwelded retainer halves and the rolling elements therebetween supported by the lower electrode 44 of FIG. 5. One of the retainer halves and the rolling elements are assembled between inner and outer raceway members, the assembly then placed on electrode 44 with the retainer half supported on the electrode projections, the other retainer half then dropped in place and the halves spot welded together by bringing rams 41, 42 (FIG. 5) towards each to clamp and weld the bearing retainers together. By employing this technique, strong welds are obtained without the expulsion of weld metal on the precision finished ball bearings. I find that I get adequate retainer strength at a lower welding power setting. By lower welding power setting I mean use of less current or shorter current duration time, or both.

In order to use a reasonable number of rolling elements, such as balls in a ball bearing, the space between them must of necessity be small, likewise, the width of retainer, as measured from bore to outside diameter is limited by the desire for deep races to impart thrust capacity to the bearing. These two limitations of space, closeness of balls and narrowness of retainer ring mean that there is less than the usual amount of metal surrounding each weld. Metal surrounding welds has the effect of quenching the metal expelled during welding. Without this surrounding metal for quenching the expulsion, there is less latitude in welding conditions than in conventional resistance welding. I find that the use of steel with low carbon content on the surface enables successful welds to be made at lower current than with high carbon steel, thus reducing the chance for expelled weld metal to damage the rolling elements and races.

As has been stated, projections 36 and 37 (FIG. 3) are preferably embossed on the flat spaces of the rings to localize the welding current at a specific spot. Thus, the predetermined positioning of the retainer rings combined with control of welding force and current enable the production of sound welds.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In the production of a welded anti-friction bearing retainer ring wherein two annular steel retainer rings having pocket sections for receiving rolling elements therein uniformly spaced along the annulus thereof separated by substantially flat faces are placed one against the other with their respective flat faces opposing each other, the improvement which comprises, providing a pair of said retainer rings having a carbon content at least at the surface of said flat faces not exceeding 0.06% by weight, contacting said rings together with their respective flat faces abutting each other, and sopt welding said rings together simultaneously across each of said flat spaces, whereby a retainer ring assembly of improved strength and ductility is obtained at each of the welds.

2. In the production of a welded ball bearing retainer ring wherein two annular steel retainer rings having ball-receiving pocket sections uniformly spaced along the annulus thereof separated by substantially flat faces are placed one against the other with their respective flat faces opposing each other, the improvement which comprises, providing a pair of said retainer rings having a carbon content at least at the surface of said flat faces not exceeding 0.06% by weight, forming a projection on each of the flat faces, contacting said rings together with their respective projections touching each other, and spot welding said rings together simultaneously across each of said contacting projections, whereby a retainer ring assembly of improved strength is obtained.

3. In the production of an anti-friction bearing having an anti-friction bearing retainer ring therein and wherein inner and outer annular raceway members are assembled together with two annular steel retainer rings having pocket sections for receiving rolling elements therein uniformly spaced along the annulus thereof each containing a rolling element, each of said pocket sections being separated by substantially flat faces in abutting relationship, the improvement which comprises, assembling said bearing with a pair of said retainer rings having a carbon content at least at the surface of said flat faces not exceeding 0.06% by weight, and spot welding said rings together simultaneously across each of said flat spaces, whereby a retainer ring assembly of improved strength is obtained.

4. In the production of an anti-friction bearing having a ball bearing retainer ring therein and wherein inner and outer annular raceway members are assembled together with two annular steel retainer rings having ball-receiving pocket sections uniformly spaced along the annulus thereof each containing a bearing ball, each of said pocket sections being separated by substantially flat faces in abutting relationship, the improvement which comprises, assembling said bearing with a pair of said retainer rings having a carbon content at least at the surface of said flat faces not exceeding 0.06% by weight, and spot welding said rings together simultaneously across each of said flat spaces, whereby a retainer ring assembly of improved strength is obtained.

5. In an annular retainer comprising two retainer rings supporting a complement of rolling elements, said rings being fastened together by spot welds on abutting surfaces of the ring between the elements and being formed of carbon steel, the improvement wherein the carbon content of the steel at the spot welds is at a level not exceeding 0.06%.

6. In an anti-friction bearing having an outer raceway member, an inner raceway member, and a complement of rolling elements engaging said raceways and retained therein by an annular retainer comprising two retainer rings fastened together by spot welds on abutting surfaces of the ring between the rolling elements said retainer being formed of carbon steel, the improvement wherein the carbon content of the steel at the spot welds is at a level not exceeding 0.06%.

7. In an annular retainer comprising two retainer rings supporting a complement of bearing balls, said rings being fastened together by spot welds on abutting surfaces of the ring between the balls and being formed of carbon steel, the improvement wherein the carbon content of the steel at the spot welds is at a level not exceeding 0.06%.

8. In an anti-friction bearing having an outer raceway member with a ball groove, an inner raceway member with a ball groove, and a complement of balls engaging said grooves and retained therein by an annular retainer comprising two retainer rings fastened together by spot welds on abutting surfaces of the ring between the balls, said retainer being formed of carbon steel, the improvement wherein the carbon content of the steel at the spot welds is at a level not exceeding 0.06%.

References Cited by the Examiner
UNITED STATES PATENTS
1,733,673   10/1929   Ronanet _____ 308—201

MARTIN P. SCHWADRON, *Primary Examiner.*
FRANK SUSKO, *Examiner.*